United States Patent
Gamoneda et al.

(10) Patent No.: US 10,067,852 B2
(45) Date of Patent: Sep. 4, 2018

(54) SWITCHING BETWEEN TRADITIONAL AND HISTORY PROGRAM TRACE MODES WITHOUT HALTING A PROCESSOR

(71) Applicants: Jonathan J. Gamoneda, Austin, TX (US); William C. Moyer, Dripping Springs, TX (US)

(72) Inventors: Jonathan J. Gamoneda, Austin, TX (US); William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 461 days.

(21) Appl. No.: 14/066,437

(22) Filed: Oct. 29, 2013

(65) Prior Publication Data

US 2015/0121150 A1  Apr. 30, 2015

(51) Int. Cl.
*G06F 11/36*    (2006.01)
(52) U.S. Cl.
CPC ................. *G06F 11/3636* (2013.01)
(58) Field of Classification Search
CPC ............. G06F 11/3466; G06F 11/3476; G06F 11/3636; G06F 11/26
USPC .......................................................... 714/45
See application file for complete search history.

(56) References Cited

U.S. PATENT DOCUMENTS

| | | | |
|---|---|---|---|
| 6,145,123 A * | 11/2000 | Torrey | G06F 9/30101 703/28 |
| 6,253,338 B1 * | 6/2001 | Smolders | G06F 11/3409 712/227 |
| 7,069,544 B1 | 6/2006 | Thekkath | |
| 7,770,156 B2 | 8/2010 | Thekkath | |
| 7,958,401 B2 | 6/2011 | Moyer | |
| 8,024,620 B2 | 9/2011 | Moyer | |
| 8,312,253 B2 | 11/2012 | Circello et al. | |
| 9,058,421 B2 * | 6/2015 | Xu | G06F 11/3636 |
| 2005/0223296 A1 * | 10/2005 | Usui | G06F 11/3648 714/39 |
| 2006/0195721 A1 * | 8/2006 | Moyer | G06F 11/3648 714/30 |
| 2008/0282234 A1 * | 11/2008 | Yanagida | G06F 11/3664 717/129 |
| 2011/0113224 A1 * | 5/2011 | Isshiki | G06F 11/3419 712/240 |
| 2013/0007532 A1 * | 1/2013 | Miller | G06F 11/349 714/45 |
| 2013/0185601 A1 * | 7/2013 | Mayer | G06F 11/3636 714/45 |

(Continued)

*Primary Examiner* — Chae M Ko

(57) ABSTRACT

In one or more embodiments, one or more systems, method, and/or processes described herein can change/switch from a first trace mode to a second trace mode without halting a system under development and/or under test. For example, a debug/trace unit can switch a trace mode without halting a processing unit of a system under development and/or under test. For instance, a debug/trace unit can switch a trace mode that can occur on a change of flow boundary of program instructions executable by a processing unit, at a branch instruction, if a region of program instructions is entered or exited, and/or if a capacity of a buffer changes. In one or more embodiments, Nexus messages can be utilized, and trace mode switches can include switches to and/or from traditional and history traces modes.

20 Claims, 3 Drawing Sheets

(56) References Cited

U.S. PATENT DOCUMENTS

2014/0095846 A1* 4/2014 Mayer ................ G06F 11/3476
712/227

* cited by examiner

SWITCHING BETWEEN TRADITIONAL AND HISTORY PROGRAM TRACE MODES WITHOUT HALTING A PROCESSOR

BACKGROUND

1. Technical Field

This disclosure relates generally to switching traces modes, and more specifically, to switching traces modes without halting a processor.

2. Description of the Related Art

Developers of processors and/or applications usually need to have access to a basic set of development tool functions in order to accomplish their jobs. For run-control, a developer typically needs to query and modify when a processor is halted, showing all locations available in a supervisor map of the processor. Moreover, a developer also usually needs support for breakpoint/watchpoint features in debuggers, either as hardware or software breakpoints depending on the architecture. For logic analysis, a developer usually needs to access instruction trace information. A developer typically needs to be able to interrogate and correlate instruction flow to real-world interactions. A developer also usually needs to retrieve information on how data flows through the system and to understand what system resources are creating and accessing data. Additionally, a developer usually needs to assess whether embedded software is meeting a required performance level.

The Nexus 5001 Forum (formerly known as the global embedded processor debug interface standard consortium (GEPDISC)) was formed to develop an embedded debug/trace interface standard (the "Nexus standard") for embedded control applications. The Nexus standard is particularly applicable to the development of automotive powertrains, data communication equipment, embedded systems, computer peripherals, wireless systems, and other control applications. The Nexus standard provides a specification and guidelines for implementing various messages, e.g., program trace messages (such as branch history messages and synchronization messages), data trace messages, and task/process identification messages (such as ownership trace messages), that may be utilized in debugging applications while minimally impacting operation of a system under development/test.

As defined by the Nexus standard, a program trace message is a message that is provided in response to a change of program flow, and the Nexus standard requires a system under development or test to be halted when changing program trace modes. This may not allow for analysis and/or debugging of a system under development and/or under test that is running in scenarios where a change of a program trace mode is needed or desired. For example, the system under development and/or under test can include and/or can be coupled to one or more peripherals that may not halt when the system under development and/or under test is halted. In one instance, data from the one or more peripherals can be lost or corrupted while the system under development and/or under test is halted to switch program trace modes. In another instance, one or more peripherals may consume data that is provided by the system under development and/or under test, and the one or more peripherals that consume data, provided by the system under development and/or under test, may malfunction and/or provide erroneous data during and/or after the system under development and/or under test is halted to switch program trace modes.

BRIEF DESCRIPTION OF THE DRAWINGS

The present disclosure is illustrated by way of example and is not limited by the accompanying figures. Elements in the figures are illustrated for simplicity and clarity and have not necessarily been drawn to scale.

DETAILED DESCRIPTION

Figure 1:
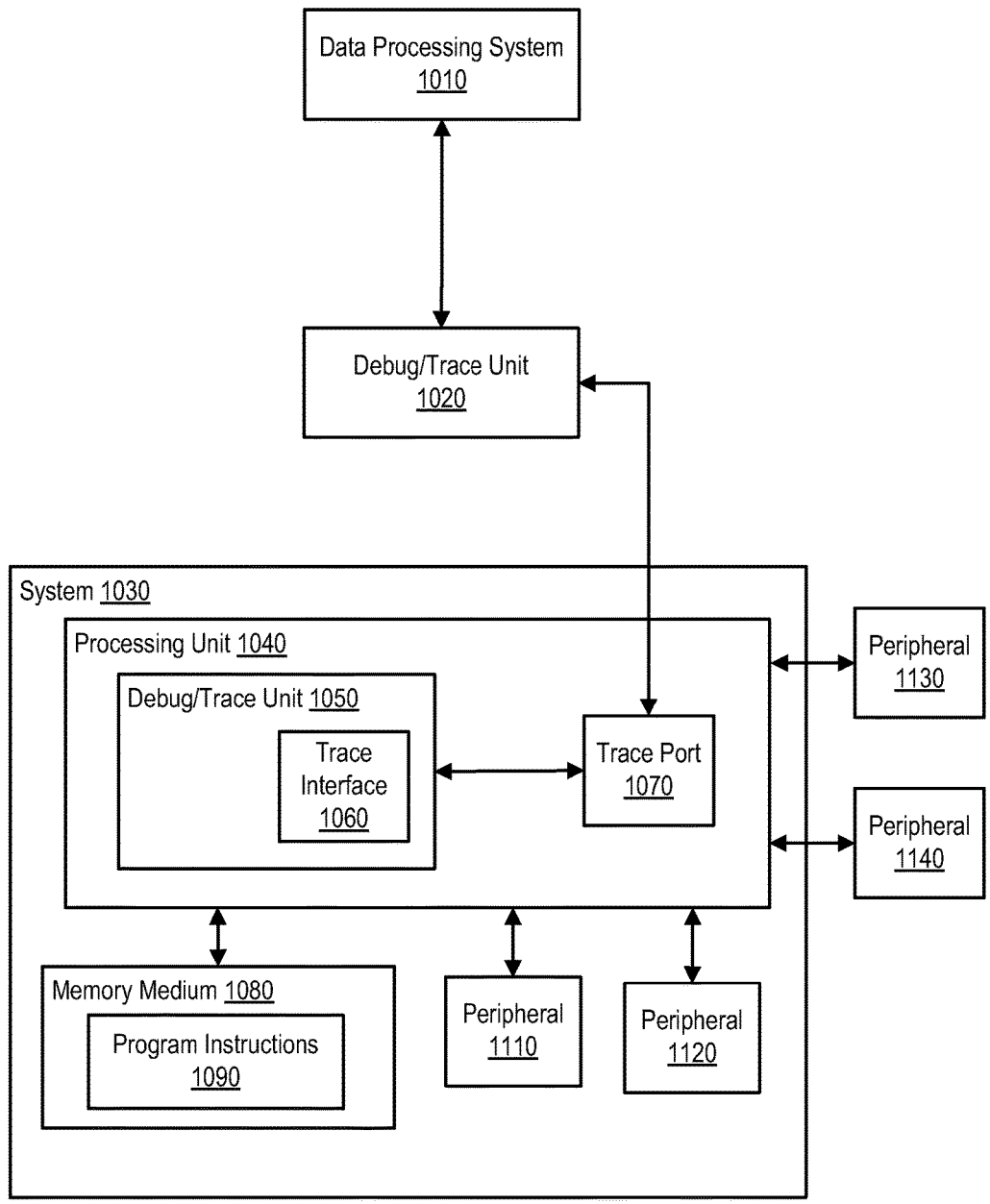
FIG. 1 provides an exemplary block diagram of a data processing system coupled to a system under development/test configured with a debug/trace unit, according to one or more embodiments.

In one or more embodiments, one or more systems, methods, and/or processes described herein can be utilized to implement switching trace modes while a system under development and/or under test is running without halting a processing unit of the system under development and/or under test. In one example, the system under development and/or under test can include and/or can be coupled to one or more peripherals that may not halt when the system under development and/or under test is halted. In one instance, switching trace modes without halting the processing unit can provide that no data from the one or more peripherals is lost or corrupted when the system under development and/or under test switches program trace modes. In another instance, switching trace modes without halting the processing unit can safeguard against a peripheral, that consumes data from the system under development and/or under test, malfunctioning and/or consuming erroneous data when the system under development and/or under test switches trace modes. In this fashion, switching trace modes without halting the processing unit can provide non-invasive real-time developmental capabilities to observe one or more states of a system, according to one or more embodiments. In another example, a developer and/or a tester can switch between history and traditional trace modes without halting a system under development and/or under test rather than forcing the developer and/or the tester to use only one trace mode while the system under development and/or under test is executing program instructions.

In one or more embodiments, one or more control registers and/or logic that can define different trace regions can be utilized. In one or more embodiments, program trace switches can occur on change of flow boundaries, such that no trace information is lost. For example, currently defined Nexus messages can be utilized if trace mode switches occur on change of flow boundaries. In one or more embodiments, trace mode switches can be performed on one or more instructions. For example, a program correlation message (PCM) can be generated that indicates a current history field and instruction count and/or program instruction position information, and a new trace mode can be utilized for future messages.

In one or more embodiments, trace messages (e.g., Nexus trace messages) can provide non-invasive real-time developmental capabilities to observe one or more states of a system, and program trace messages can be generated in two different modes: a traditional mode (e.g., messages are generated for every change of flow event) and a history mode (e.g., direct change of flows are captured in a buffer and a trace message is generated for indirect change of flows). In one example, a history trace mode is generally used for cases where traditional trace mode overflows an internal first in first out (FIFO) buffer. In another example, a traditional trace mode can be utilized for correlating a program trace message with data trace events.

Turning now to FIG. 1, an exemplary block diagram of a data processing system coupled to a system under development/test configured with a debug/trace unit is illustrated, according to one or more embodiments. As shown, a data processing system 1010 can be coupled to a debug/trace unit 1020. As illustrated, a system 1030 can include a processing unit 1040 (e.g., a chip-level processing unit, an integrated circuit processing unit, a system on chip processing unit, etc.). In one or more embodiments, the term "coupled" can include both direct electrical connection between/among elements and indirect electrical connection between/among elements that is achieved with one or more intervening elements.

In one or more embodiments, processing unit 1040 can include one or more portions of a debug/trace unit 1050 that can be coupled to one or more buses of processing unit 1040 and/or system 1030. In one or more embodiments, processing unit 1040 can be coupled to debug/trace unit 1050 that can be coupled to one or more buses of processing unit 1040 and/or system 1030. Debug/trace unit 1050 can interface with various units of processing unit 1040 and can gather information regarding state and/or processing associated with the various units of processing unit 1040. For example, debug/trace unit 1050 can interface with a performance monitor and gather information associated with the various units of processing unit 1040.

In one or more embodiments, debug/trace unit 1050 can perform one or more operations without affecting operation of system 1030. In one or more embodiments, one or more of system 1030, processing unit 1040, and debug/trace unit 1050 can be configured to process and/or transform data and/or events in accordance with at least a portion of one or more of methods, processes and/or flowcharts described herein. As such, one or more of system 1030, processing unit 1040, and debug/trace unit 1050 can be, can include, and/or can form one or more means for performing one or more functions in accordance with at least a portion of one or more of methods, processes and/or flowcharts described herein, according to one or more embodiments.

As shown, debug/trace unit 1050 can include a trace interface 1060. In one or more embodiments, trace interface 1060 can include a Nexus trace interface. For example, trace interface 1060 can be compliant with a Nexus standard (e.g., Nexus 5001). In one or more embodiments, trace interface 1060 can form and/or output one or more trace messages. For example, trace interface 1060 can form and output messages based on events of a performance monitor. As illustrated, processing unit 1040 can include a trace port 1070 coupled to debug/trace unit 1050. In one or more embodiments, trace port 1070 can be compatible with one or more pin interfaces and/or hardware protocols. In one example, trace port 1070 can be compatible with a pin interface and/or hardware protocol of IEEE (Institute of Electrical and Electronics Engineers) 1149.1 or JTAG (Joint Test Action Group). For instance, trace port 1070 can be coupled to a JTAG debug unit of a computer system. In another example, trace port 1070 can be compatible with a Nexus AUX port. In one or more embodiments, trace interface 1060 and/or trace port 1070 can provide one or more additional pin interfaces and/or hardware protocols and/or augment one or more existing pin interfaces and/or hardware protocols.

As illustrated, system 1030 can be coupled to a debug/trace unit 1020 via a trace port 1070. In one or more embodiments, debug/trace unit 1020 can receive one or more trace messages formed by a trace interface 1060, and the trace messages can be conveyed via one or more packets of data via trace port 1070 to debug/trace unit 1020. In one or more embodiments, debug/trace unit 1020 can be external to a data processing system 1010 (as shown), or debug/trace unit 1020 can be included in data processing system 1010 (not shown).

As shown, system 1030 can include peripherals 1110 and 1120 that can be coupled to processing unit 1040. As illustrated, peripherals 1130 and 1140 can be external to system 1030 and can be coupled to processing unit 1040. In one or more embodiments, processing unit 1040 can provide data to one or more of peripherals 1110-1140, and/or processing unit 1040 can receive data from one or more of peripherals 1110-1140.

In one or more embodiments, one or more peripherals can include one or more of a storage device, an expansion card, a bus (e.g., an universal serial bus, a peripheral component interconnect bus, etc.), a sound input device, a sound output device, an image input device (e.g., a camera, a color sensor, etc.), an image output device (e.g., a display, a printer, etc.), a real-time clock, a daughterboard, a joystick, a mouse, a keyboard, a network interface (e.g., a wired network interface, a wireless network interface, etc.), a receiver (e.g., a wired receiver, a wireless receiver, etc.), a transmitter (e.g., a wired transmitter, a wireless transmitter, etc.), a sensor, and a MEMS (microelectromechanical system) device, among others. In one example, processing unit 1040 can be receiving information (e.g., data, instructions executable by processing unit 1040, etc.) from a storage device when switching trace modes is needed and/or desired.

Since, for instance, debug/trace unit 1050 can switch trace modes without halting processing unit 1040, no data, debug information, and/or profiling information (associated with receiving the information from the storage device) is lost during the trace mode switch. In a second example, processing unit 1040 can be receiving data from a sensor device when switching trace modes is needed and/or desired. For instance, no data, debug information, and/or profiling information (associated with receiving the information from the sensor device) is lost during the trace mode switch, since debug/trace unit 1050 can switch trace modes without halting processing unit 1040.

In another example, processing unit 1040 can be providing data to a device when switching trace modes is needed and/or desired. In one instance, no data, debug information, and/or profiling information (associated with providing the information to the device) is lost during the trace mode switch, since debug/trace unit 1050 can switch trace modes without halting processing unit 1040. In another instance, the device will not starve for data, provided via processing unit 1040, during the trace mode switch, since debug/trace unit 1050 can switch trace modes without halting processing unit 1040. In one or more of the aforesaid examples, a developer and/or a tester can switch between history and traditional trace modes without halting a system under development and/or under test (e.g., system 1030) rather than forcing the developer and/or the tester to use only one trace mode while the system under development and/or under test is executing program instructions (e.g., program instructions 1090), according to one or more embodiments.

In one or more embodiments, data processing system 1010 can include a processor (not shown) coupled to a memory medium (not shown), where the processor can execute program instructions from the memory medium to perform various functions, such as interfacing with trace unit 1020 and a human being. In one example, data processing system 1010 can be or include any of various types of devices, including a computer system, such as a desktop computer system, a portable computer, a laptop computer system, a personal digital assistant (PDA), a smart phone, or a tablet computing device, among others. In another example, data processing system 1010 can include and/or be coupled to one or more human interface devices such as an output device, e.g., a display, and an input device, e.g., a keyboard. Data processing system 1010 can include and/or be coupled to other devices, such as a mouse, one or more speakers, a printer, a track ball, and a microphone, among others.

In one or more embodiments, storage and/or a memory medium can include one or more storage devices. In one example, storage and/or a memory medium can include one or more non-transitory tangible computer readable storage devices. Storage and/or a memory medium can include, in another example, an application appropriate amount of volatile memory (e.g., dynamic random access memory (DRAM)), non-volatile memory (e.g., flash, read-only memory (ROM), or static RAM), and/or non-volatile mass storage devices, such as magnetic, solid state, and/or optical disk drives.

In one or more embodiments, switching between history and traditional trace modes without halting a system under development and/or under test (e.g., system 1030) can provide a developer and/or a tester utilization of both history and traditional trace modes rather than forcing the developer and/or the tester to use only one mode. For example, dynamic switching of program trace modes can allow the developer and/or the tester an ability to optimize program trace modes for different regions of code (e.g., different regions or different portions of program instructions 1090, stored via a memory medium 1080, executable by a processing unit 1040). For instance, specific regions of code execution can be defined that can select an appropriate type of trace mode. Regions of code can be defined and/or controlled multiple ways with watchpoints, FIFO buffer utilization, direct address ranges, etc. For example, history mode can be selected for boot up code, and then a dynamic mode switch (e.g., a mode switch without halting a system under development and/or under test) to a traditional mode for problematic sections of program instructions to generate further information.

Figure 2:
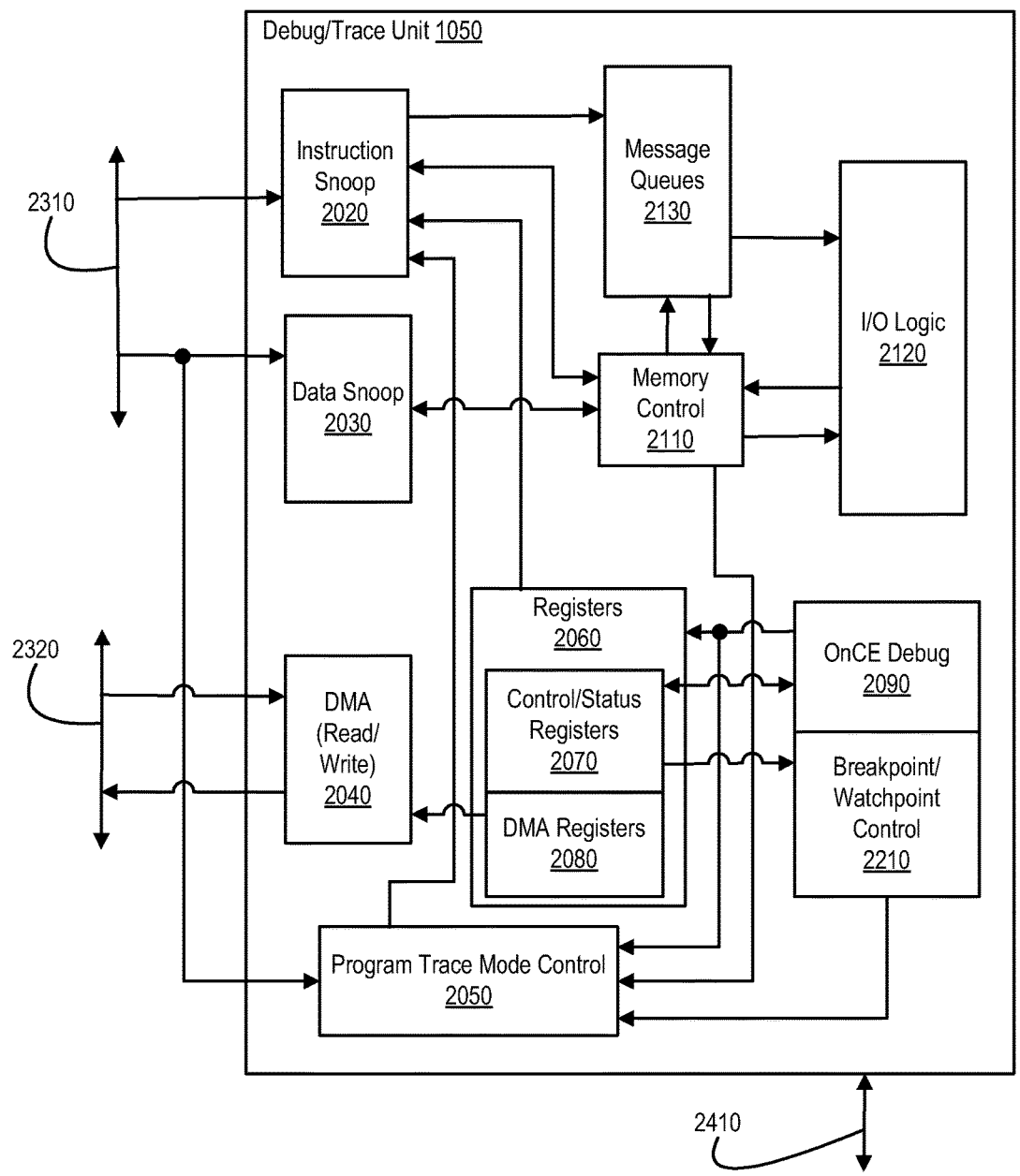
FIG. 2 provides an exemplary block diagram of a debug/trace unit, according to one or more embodiments.

Turning now to FIG. 2, an exemplary block diagram of a debug/trace unit is illustrated, according to one or more embodiments. As shown, debug/trace unit 1050 can include one or more of an instruction snoop 2020, a data snoop 2030, a DMA (direct memory access) 2040, a program trace mode control 2050, registers 2060 that can include one or more of control/status registers 2070 and DMA registers 2080, an on-chip emulator (OnCE) 2090, a memory control 2110, an I/O logic 2120, message queues 2130 (e.g., FIFO buffers), and breakpoint/watchpoint control 2210, among others. As illustrated, instruction snoop 2020, data snoop 2030, and program trace mode control 2050 can be coupled to a bus 2310. For example, bus 2310 can be or include a zen internal bus. In one or more embodiments, an interface 2410 can be utilized to communicate one or more signals with one or more of trace interface 1060, processing unit 1040, and system 1030, among others.

As shown, DMA 2040 can be coupled to a bus 2320. In one example, bus 2320 can be or include an AMBA (advanced microcontroller bus architecture) high-performance bus (AHB). In another example, bus 2320 can be or include a system bus. As illustrated, instruction snoop 2020 can be coupled to one or more of message queues 2130, memory control 2110, registers 2060, and program trace mode control 2050. As shown, data snoop can be coupled to memory control 2110. As illustrated, program trace mode control can be coupled to one or more of memory control 2110, OnCE debug 2090, and breakpoint/watchpoint control 2210. As shown, control/status registers 2070 can be coupled to one or more of OnCE debug 2090 and breakpoint/watchpoint control 2210, and DMA registers 2080 can be coupled to DMA 2040. As illustrated, memory control 2110 can be coupled to one or more of message queues 2130 and I/O logic 2120.

In one or more embodiments, watchpoint trigger registers allows watchpoints defined within logic to trigger actions. For example, the watchpoints can control program and/or data trace enable and disable, as well as to control program trace mode switching. For instance, control bits can be utilized to produce a related "window" for triggering mode switches.

In one or more embodiments, a bit of a control/status register can be utilized to switch program trace modes. For example, a bit of a control/status register can be utilized to switch from history mode to traditional mode and/or to switch from traditional mode to history mode. For instance, a bit of a device control (DC) register 3030, illustrated in FIG. 3, can be utilized to switch program trace modes.

Figure 3:
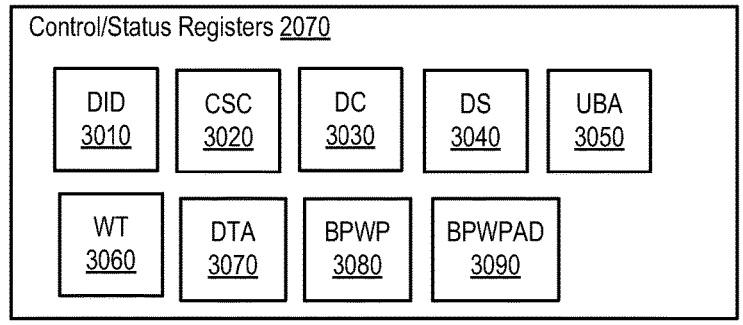
FIG. 3 provides an exemplary block diagram of control/status registers, according to one or more embodiments.

Turning now to FIG. 3, an exemplary block diagram of control/status registers is illustrated, according to one or more embodiments. As shown, control/status registers 2070 can include one or more of a device identification (DID) register 3010 that can be utilized for selection and/or discrimination of subsystems and/or integrated circuits and a client select (CSC) register 3020 that can be configured to include an originating source of information for trace and/or other messages. As illustrated, control/status registers 2070 can include one or more of a DC register 3030 that can be configured to include debug parameter information and/or configuration information and a device status (DS) register 3040 that can be configured to include status information.

As shown, control/status registers 2070 can include one or more of a user base address (UBA) register 3050 that can be configured to define a base address and/or a truncated addressing mode and watchpoint trigger (WT) registers 3060 that can be configured to provide watchpoint and/or breakpoint status(es). As illustrated, control/status registers 2070 can include one or more of data trace attribute (DTA) registers 3070 that can be configured to include information on recent trace operations and/or program information which can be utilized to reconstruct a trace and a breakpoint/watchpoint control (BPWP) register 3080 that can be configured with watchpoint and/or breakpoint information. As shown, control/status registers 2070 can include and breakpoint/watchpoint address/data (BPWPAD) registers 3090 that can be configured to define address and/or data utilizable in assigning watchpoint and/or breakpoint locations.

TABLE 1

| Bits | Name | Description |
| --- | --- | --- |
| 15:12 | PTT | PTT—Program Trace Traditional. Switch to traditional mode when event is seen. |

TABLE 1-continued

| Bits | Name | Description |
|------|------|-------------|
|      |      | 0000 - Disabled |
|      |      | 0001 - Use Watchpoint #0 |
|      |      | 0010 - Use Watchpoint #1 |
|      |      | . . . |
|      |      | 1110 - Use Watchpoint #13 |
|      |      | 1111 - Use control setting in the PTTWS register |
| 11:8 | PTH  | PTH—Program Trace History. Switch to history mode when event is seen. |
|      |      | 0000 - Disabled |
|      |      | 0001 - Use Watchpoint #0 |
|      |      | 0010 - Use Watchpoint #1 |
|      |      | . . . |
|      |      | 1110 - Use Watchpoint #13 |
|      |      | 1111 - Use control setting in the PTHWS register |

In one or more embodiments, a WT register (e.g. a WT register of WT registers 3060) can be used to control triggering by a single selected watchpoint. For example, a WT register with watchpoint trigger register fields in accordance with Table 1 can be utilized to control triggering by a single selected watchpoint.

In one or more embodiments, a program trace start trigger control (PTSTC), a program trace end trigger control (PTETC), a data trace start trigger control (DTSTC), a data trace end trigger control (DTETC), a FIFO flush watchpoint select (FFWS) register, a program trace traditional watchpoint select (PTTWS) register, and a program trace history watchpoint select (PTHWS) register can be utilized for extended trigger controls for a respective function. If multiple watchpoints are utilized for triggering, or if a watchpoint beyond a thirteenth watchpoint is required, then one or more extended watchpoint trigger registers can be utilized. For instance, a field encoding of 4'b1111 in one of the WT register fields can enable a corresponding extended trigger register. For other WT field encodings, a corresponding extended trigger register can be disabled, and contents can be ignored.

Figure 4:
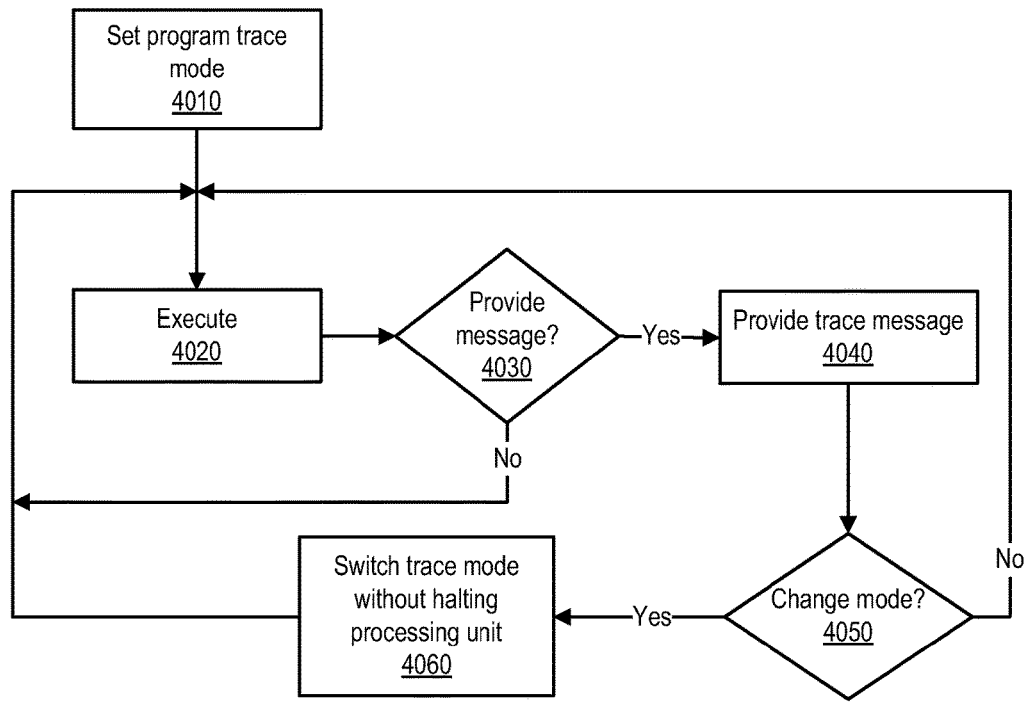
FIG. 4 provides an exemplary method of operating a debug/trace unit, according to one or more embodiments.

Turning now to FIG. 4, a method of operating a debug/trace unit is illustrated, according to one or more embodiments. At 4010, a trace mode can be set. For example, debug/trace unit 1050 can receive a trace mode and can set a control status register (e.g., a control status register of registers 2060) to the trace mode. For instance, program trace mode control 2050 can set a bit in DC register 3030 to set the trace mode.

At 4020, one or more instructions executable by processing unit 1040 can be executed. For example, processing unit 1040 can execute the one or more instructions. At 4030, it can be determined if a trace message is to be provided. For example, debug/trace unit 1050 can determine if a trace message is to be provided.

If a trace message is to be provided, the trace message can be provided at 4040. For example, debug/trace unit 1050 can provide the trace message to debug/trace unit 1020. If a trace message is not to be provided, the method can proceed to 4020, where additional one or more instructions executable by processing unit 1040 can be executed.

In one or more embodiments, a trace message (e.g., a Nexus trace message) can provide a non-invasive real-time developmental capability to observe one or more states of system 1030 and/or processing unit 1040. For example, the trace message can include one or more of a program trace correlation (PTC) message, a PCM, an ownership trace message (OTM), a data trace message (DTM), and a branch trace message (BTM), among others. For instance, a PCM can provide information, such as one or more of a branch history and a sequence count (e.g., instruction count), among others.

In one or more embodiments, processing unit 1040 can be configured to transparently execute multiple instruction sets with unique binary encodings, such as a normal fixed length instruction set and an alternate variable length encoded (VLE) instruction set, among others. For example, when a branch results in an execution mode switch into or out of VLE instructions, a PCM can be generated.

In one or more embodiments, a register bit of a register of control/status registers 2070 can be set, and in response to the register bit of the register of control/status registers 2070 being set, a PCM can be generated. For example, the register bit of the register of control/status registers 2070 can indicate a mode change on a portion of programming instructions that does not include a change of flow boundary, and the PCM can include information associated with the mode change on the portion of programming instructions that does not include the change of flow boundary.

At 4050, it can be determined if there is a mode change. For example, program trace mode control 2050 can determine if there is a mode change. In one instance, program trace mode control 2050 can determine if there is a mode change from a traditional mode (e.g., messages are generated for every change of flow event) to a history mode (e.g., direct change of flows are captured in a buffer and a trace message is generated for indirect change of flows). In another instance, program trace mode control 2050 can determine if there is a mode change from a history mode to a traditional mode.

In one or more embodiments, determining if there is a mode change can include and/or can be in response to determining if there is a change of flow boundary of the instructions executable by processing unit 1040. For example, program trace mode control 2050 can determine if there is a change of flow boundary of the instructions executable by processing unit 1040. For instance, determining if there is a change of flow boundary can ensure that no trace information is lost. In one or more embodiments, a change of flow boundary can include a position of code (e.g., one or more instructions executable by processing unit 1040). In one example, a change of flow boundary can include branch code and/or a branch instruction. In another example, a change of flow boundary can include a pseudo instruction. In one instance, a pseudo instruction can include two or more instructions of an instruction set architecture (ISA). In another instance, a pseudo instruction can be a translation of a first instruction of an ISA to a second, different, instruction of the ISA.

In one or more embodiments, determining if there is a mode change can include and/or can be in response to determining if there is not a change of flow boundary of the instructions executable by processing unit 1040. In one example, program trace mode control 2050 can determine if there is not a change of flow boundary of the instructions executable by processing unit 1040.

In one or more embodiments, a register bit of a register of control/status registers 2070 can indicate a mode change on a portion of programming instructions that does not include a change of flow boundary, and determining if there is a mode change can include and/or can be in response to determining if the register bit of the register of control/status registers 2070 is set. For example, determining if there is a mode change can include and/or can be in response to determining if the register bit of the register of control/status registers 2070 is set (e.g., set to a value).

In one or more embodiments, determining if there is a mode change can include and/or can be in response to determining a capacity of a FIFO buffer. In one example, program trace mode control 2050 can determine if a FIFO buffer is at capacity or is almost at capacity (e.g., at or above a "high water" mark, at or above a threshold, etc.). For instance, program trace mode control 2050 can determine if a FIFO buffer of message queues 2130 is at capacity or is almost at capacity. In one or more embodiments, if a FIFO buffer of message queues 2130 is full or is almost full, a mode can be changed from a traditional mode to a history mode.

In another example, program trace mode control 2050 can determine if a FIFO buffer is not at capacity (e.g., below capacity) or is not almost at capacity (e.g., below a "high water" mark, at or below a threshold, etc.). For instance, program trace mode control 2050 can determine if a FIFO buffer of message queues 2130 is not at capacity or is not almost at capacity. In one or more embodiments, if a FIFO buffer of message queues is not at capacity or is not almost at capacity, a mode can be changed from a history mode to a traditional mode.

In one or more embodiments, determining if there is a mode change can include and/or can be in response to determining if a region of code (e.g., one or more instructions executable by processing unit 1040) is entered or exited. For example, program trace mode control 2050 can determine if a region (e.g., a trace region) of code is entered or exited. In one or more embodiments, determining if there is a mode change can include and/or can be in response to determining if a watchpoint and/or a breakpoint is reached. For example, program trace mode control 2050 can determine if a watchpoint and/or a breakpoint is reached. In one instance, determining if a watchpoint and/or a breakpoint is reached can include accessing a WT register (e.g. a WT register of WT registers 3060). In another instance, determining if a watchpoint and/or a breakpoint is reached can include accessing watchpoint trigger register fields, associated with a WT register (e.g. a WT register of WT registers 3060), in accordance with Table 1.

If there is a change of a trace mode, the trace mode can be switched without halting processing unit 1040, at 4060. For example, program trace mode control 2050 can change the trace mode. For instance, program trace mode control 2050 can toggle a bit in DC register 3030 to change/switch trace modes. If there is not a change of a trace mode, the method can proceed to 4020, where additional one or more instructions executable by processing unit 1040 can be executed.

In one or more embodiments, switching trace modes without halting processing unit 1040 can include processing unit 1040 continuing to process data from one or more peripherals and/or continuing to provide data to one or more peripherals. In one example, switching trace modes without halting the processing unit can provide that no data from the one or more peripherals is lost or corrupted when processing unit 1040 switches program trace modes. In a second example, switching trace modes without halting the processing unit can safeguard against a peripheral, that consumes data from processing unit 1040, malfunctioning and/or consuming erroneous data when processing unit 1040 switches trace modes. In this fashion, switching trace modes without halting processing unit 1040 can provide non-invasive real-time developmental capabilities to observe one or more states of a system, according to one or more embodiments. In another example, a developer and/or a tester can switch between history and traditional trace modes without halting processing unit 1040 rather than forcing the developer and/or the tester to use only one trace mode while processing unit 1040 is executing program instructions.

As presented via the described embodiments, a system, comprises: a processing unit; a memory coupled to the processing unit that is configured to store program instructions executable by the processing unit; and a debug/trace unit coupled to the processing unit. In one or more embodiments, the processing unit executes a first portion of the program instructions utilizing a first trace mode; the debug/trace unit: determines that the first trace mode is to be switched to a second trace mode; and switches from the first trace mode to the second trace mode without halting the processing unit; and the processing unit executes a second portion of the program instructions utilizing the second trace mode. In one example, the processing unit executes the second portion of the program instructions after the debug/trace unit switches from the first trace mode to the second trace mode without halting the processing unit.

In a second example, if the first trace mode is a traditional trace mode and when the debug/trace unit switches from the first trace mode to the second trace mode without halting the processing unit, the debug/trace unit switches from the traditional trace mode to a history trace mode without halting the processing, where the history trace mode is the second trace mode. In another example, if the first trace mode is the history trace mode and when the debug/trace unit switches from the first trace mode to the second trace mode without halting the processing unit, the debug/trace unit switches from the history trace mode to the traditional trace mode without halting the processing, where the traditional trace mode is the second trace mode.

In one or more embodiments, the debug/trace unit determines that there is a change of flow boundary of the program instructions, and in response to the debug/trace unit determining that there is a change of flow boundary of the program instructions, the debug/trace unit determines that the first trace mode is to be switched to the second trace mode. For example, the change of flow boundary of the program instructions includes at least one branch instruction.

In one or more embodiments, the debug/trace unit determines a capacity of a buffer, and in response to the debug/trace unit determining a capacity of a buffer, the debug/trace unit determines that the first trace mode is to be switched to the second trace mode. In one or more embodiments, the debug/trace unit determines at least one of a region of the program instructions being entered, the region of the program instructions being exited, a watchpoint being reached, and a breakpoint being reached, and in response to the debug/trace unit determining at least one of a region of the program instructions being entered, the region of the program instructions being exited, a watchpoint being reached, and a breakpoint being reached, the debug/trace unit determines that the first trace mode is to be switched to the second trace mode. In one or more embodiments, the processing unit includes at least a portion of the debug/trace unit.

As presented via the described embodiments, a debug/trace unit configured to be coupled to a processing unit that is configured to execute program instructions, and while the processing unit executes the program instructions the debug/trace unit: determines that a first trace mode is to be switched to a second trace mode; and switches from the first trace mode to the second trace mode without halting the processing unit; if the first trace mode is a traditional trace mode and when the debug/trace unit switches from the first trace mode to the second trace mode without halting the processing unit, the debug/trace unit switches from the traditional trace mode to a history trace mode without halting the processing, where the history trace mode is the second trace mode; and if the first trace mode is the history trace mode and when the debug/trace unit switches from the first trace mode to the second trace mode without halting the processing unit, the debug/trace unit switches from the history trace mode to the traditional trace mode without halting the processing, where the traditional trace mode is the second trace mode.

In one or more embodiments, the debug/trace unit determines that there is a change of flow boundary of the program instructions, and in response to the debug/trace unit determining that there is a change of flow boundary of the program instructions, the debug/trace unit determines that the first trace mode is to be switched to the second trace mode. For example, the change of flow boundary of the program instructions includes at least one branch instruction.

In one or more embodiments, the debug/trace unit determines that there is a change of flow boundary of the program instructions, and in response to the debug/trace unit determining that there is a change of flow boundary of the program instructions, the debug/trace unit determines that the first trace mode is to be switched to the second trace mode. In one or more embodiments, the debug/trace unit determines at least one of: a region of the program instructions being entered and the region of the program instructions being exited, and in response to the debug/trace unit determining at least one of: a region of the program instructions being entered and the region of the program instructions being exited, the debug/trace unit determines that the first trace mode is to be switched to the second trace mode.

In one or more embodiments, the debug/trace unit determining at least one of: a watchpoint being reached and a breakpoint being reached, and in response to the debug/trace unit determining at least one of: a watchpoint being reached and a breakpoint being reached, the debug/trace unit determines that the first trace mode is to be switched to the second trace mode. In one or more embodiments, the processing unit includes at least a portion of the debug/trace unit.

As presented via the described embodiments, a method comprises: executing first instructions executable by a processing unit; providing a trace message associated with a first trace mode; determining that the first trace mode is to be switched to a second trace mode; switching from the first trace mode to the second trace mode without halting the processing unit; and executing second instructions executable by the processing unit. In one example, if the first trace mode is a traditional trace mode, switching from the first trace mode to the second trace mode without halting the processing unit includes switching from the traditional trace mode to a history trace mode without halting the processing, where the history trace mode is the second trace mode. In another example, if the first trace mode is the history trace mode, switching from the first trace mode to the second trace mode without halting the processing unit includes switching from the history trace mode to the traditional trace mode without halting the processing, where the traditional trace mode is the second trace mode.

In one or more embodiments, the method further comprises: determining that there is a change of flow boundary of the first instructions executable by the processing unit, and in response to determining that there is a change of flow boundary of the first instructions executable by the processing unit, determining that the first trace mode is to be switched to the second trace mode. In one or more embodiments, the method further comprises: determining a capacity of a buffer, and in response to determining a capacity of a buffer, determining that the first trace mode is to be switched to the second trace mode. In one or more embodiments, the method further includes determining at least one of: a region of the first instructions being entered, the region of the first instructions being exited, a watchpoint being reached, and a breakpoint being reached, and in response to determining at least one of: a region of the first instructions being entered, the region of the first instructions being exited, a watchpoint being reached, and a breakpoint being reached, determining that the first trace mode is to be switched to the second trace mode.

The term "memory medium" and/or "computer readable storage medium" can include various types of memory and/or storage. For example, memory medium and/or computer readable storage medium can include an installation medium, e.g., a CD-ROM, DVD-ROM, floppy disks, etc., a random access memory or computer system memory (volatile and/or non-volatile memory) such as DDR SDRAM, DRAM, SRAM, EDO RAM, NVRAM, EPROM, EEPROM, flash memory etc., and/or a non-volatile storage such as a magnetic media, e.g., a hard drive, and/or optical storage. In one or more embodiments, a memory medium and/or computer readable storage medium can include other types of memory and/or storage as well, or combinations thereof. In one or more embodiments, a memory medium and/or computer readable storage medium can be and/or include a product, e.g., a software product, and/or an article of manufacture that includes machine (e.g., processor) executable instructions that implement one or more portions of methods and/or processes described herein.

As will be appreciated, the processes and/or methods of one or more embodiments can be implemented using any combination of software, firmware, and/or hardware. As a preparatory step to practicing the embodiments in software, code (whether software or firmware) according to one or more embodiments can be stored in one or more machine readable storage mediums such as semiconductor memories such as read-only memories (ROMs), programmable ROMs (PROMs), etc., thereby making an article of manufacture in accordance with the embodiments. The article of manufacture including the code is used by either executing the code directly from the storage device or by copying the code from the storage device into another storage device such as a random access memory (RAM), etc. An apparatus for practicing the techniques of the present disclosure could be one or more communication devices. As may be used herein, a software system can include one or more objects, agents, threads, subroutines, separate software applications, two or more lines of code or other suitable software structures operating in one or more separate software applications, on one or more different processors, or other suitable software architectures.

In one or more embodiments, a processor (e.g., a processing unit, a central processing unit, a CPU, etc.) can execute instructions from a memory medium that stores the instructions that can include one or more software programs in accordance with one or more of methods, processes and/or flowcharts described herein. In one example, the processor and the memory medium, that stores the instructions which can include one or more software programs in accordance with one or more of methods, processes and/or flowcharts described herein, can form one or more means for one or more functionalities described with references to methods, processes and/or flowcharts herein. In another example, an ASIC (application specific integrated circuit) can be configured with one or more configurations in accordance with one or more of methods, processes and/or flowcharts described herein, that can form one or more means for one or more functionalities described with references to methods, processes and/or flowcharts herein.

Although this disclosure is described herein with reference to specific embodiments, various modifications and changes can be made without departing from the scope of the embodiments as set forth herein. Accordingly, the specification and figures are to be regarded in an illustrative rather than a restrictive sense, and all such modifications are intended to be included with the scope of the embodiments. Any benefits, advantages, or solution to problems that are described herein with regard to specific embodiments are not intended to be construed as a critical, required, or essential feature or element of any or all the embodiments.

Unless stated otherwise, terms such as "first" and "second" are used to arbitrarily distinguish between the elements such terms describe. Thus, these terms are not necessarily intended to indicate temporal or other prioritization of such elements.

It is noted that, in one or more embodiments, one or more of the method elements described herein and/or one or more portions of an implementation of a method element may be performed in varying orders, may be performed concurrently with one or more of the other method elements and/or one or more portions of an implementation of a method element, or may be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is noted that, in one or more embodiments, one or more of the method elements described herein and/or one or more portions of an implementation of a method element can be implemented using logic implemented in hardware (e.g., one or more integrated circuits). In one example, one or more of the method elements described herein and/or one or more portions of an implementation of a method element can be implemented using one or more state machines implemented using logic implemented in hardware. It is also noted that, in one or more embodiments, one or more of the system elements described herein can be omitted and additional system elements can be added as desired.

Further modifications and alternative embodiments of various aspects of the embodiments may be apparent to those skilled in the art in view of this description. Accordingly, this description is to be construed as illustrative only and is for the purpose of teaching those skilled in the art the general manner of carrying out the embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of one or more inventions as described in the following claims.

What is claimed is:

1. A system, comprising: a processing unit;
   a memory coupled to the processing unit that is configured to store program instructions executable by the processing unit; and
   a debug/trace unit coupled to the processing unit;
   wherein the processing unit executes a first portion of the program instructions utilizing a first trace mode;
   wherein the debug/trace unit:
   determines that there is a change of flow boundary of the program instructions based on at least one branch instruction;
   determines that the first trace mode is to be switched to a second trace mode based on the change of flow boundary of the program instructions and based on a status of a hardware register of the debug/trace unit; and
   switches from the first trace mode to the second trace mode without halting the processing unit to prevent a malfunction of a peripheral when the first and second trace modes are switched, wherein the peripheral consumes data from the processing unit; and
   wherein the processing unit executes a second portion of the program instructions utilizing the second trace mode.

2. The system of claim 1, wherein the processing unit includes at least a portion of the debug/trace unit.

3. The system of claim 1, wherein the debug/trace unit further determines a capacity of a buffer and determines that the second trace mode is to be switched to the first trace mode based on the capacity of the buffer.

4. The system of claim 1, wherein the debug/trace unit further determines at least one of a region of the program instructions being entered, the region of the program instructions being exited, a watchpoint being reached, and a breakpoint being reached and determines that the second trace mode is to be switched to the first trace mode based on determining the at least one of the region of the program instructions being entered, the region of the program instructions being exited, the watchpoint being reached, and the breakpoint being reached.

5. The system of claim 1,
   wherein if the first trace mode is a traditional trace mode and when the debug/trace unit switches from the first trace mode to the second trace mode without halting the processing unit, the debug/trace unit switches from the traditional trace mode to a history trace mode without halting the processing, wherein the history trace mode is the second trace mode; and
   wherein if the first trace mode is the history trace mode and when the debug/trace unit switches from the first trace mode to the second trace mode without halting the processing unit, the debug/trace unit switches from the history trace mode to the traditional trace mode without halting the processing, wherein the traditional trace mode is the second trace mode.

6. The system of claim 1, wherein the processing unit executes the second portion of the program instructions after the debug/trace unit switches from the first trace mode to the second trace mode without halting the processing unit.

7. The system of claim 1, wherein after the debug/trace unit determines that there is the change of flow boundary of the program instructions, the debug/trace unit further determines that there is not a change of flow boundary of the second portion of the program instructions and determines that the second trace mode is to be switched to the first trace mode based on no change of flow boundary of the program instructions.

8. A debug/trace unit configured to be coupled to a processing unit that is configured to execute program instructions, wherein while the processing unit executes the program instructions the debug/trace unit:

determines that there is a change of flow boundary of the program instructions based on at least one branch instruction;

determines that a first trace mode is to be switched to a second trace mode based on the change of flow boundary of the program instructions and based on a status of a hardware register of the debug/trace unit; and switches from the first trace mode to the second trace mode without halting the processing unit to prevent a consumption of erroneous data by a peripheral when the first and second trace modes are switched, wherein the peripheral consumes data from the processing unit.

9. The debug/trace unit of claim 8, wherein the processing unit includes at least a portion of the debug/trace unit.

10. The debug/trace unit of claim 8, wherein the debug/trace unit further determines a capacity of a buffer and determines that the second trace mode is to be switched to the first trace mode based on the capacity of the buffer.

11. The debug/trace unit of claim 8, wherein the debug/trace unit further determines at least one of: a region of the program instructions being entered and the region of the program instructions being exited and determines that the second trace mode is to be switched to the first trace mode based on the at least one of the region of the program instructions being entered and the region of the program instructions being exited.

12. The debug/trace unit of claim 8, wherein in response to the debug/trace unit determining at least one of: a watchpoint being reached and a breakpoint being reached, the debug/trace unit determines that the first trace mode is to be switched to the second trace mode.

13. The debug/trace unit of claim 8,
wherein when the debug/trace unit switches from the first trace mode to the second trace mode without halting the processing unit, the processing unit executes a first portion of the program instructions;
wherein after the debug/trace unit switches from the first trace mode to the second trace mode without halting the processing unit, the processing unit executes a second portion of the program instructions; and
wherein the debug/trace unit further determines that there is not a change of flow boundary of the second portion of the program instructions and determines that the second trace mode is to be switched to the first trace mode based on no change of flow boundary of the program instructions.

14. The debug/trace unit of claim 8,
wherein if the first trace mode is a traditional trace mode and when the debug/trace unit switches from the first trace mode to the second trace mode without halting the processing unit, the debug/trace unit switches from the traditional trace mode to a history trace mode without halting the processing, wherein the history trace mode is the second trace mode; and
wherein if the first trace mode is the history trace mode and when the debug/trace unit switches from the first trace mode to the second trace mode without halting the processing unit, the debug/trace unit switches from the history trace mode to the traditional trace mode without halting the processing, wherein the traditional trace mode is the second trace mode.

15. A method, comprising:
executing first instructions executable by a processing unit;
providing a trace message associated with a first trace mode;
determining that there is a change of flow boundary of the first instructions based on at least one branch instruction;
determining that the first trace mode is to be switched to a second trace mode based on the change of flow boundary of the first instructions and based on a status of a hardware register of a debug/trace unit;
switching from the first trace mode to the second trace mode without halting the processing unit;
preventing a malfunction of a peripheral when the first and second trace modes are switched, wherein the peripheral consumes data from the processing unit; and
executing second instructions executable by the processing unit.

16. The method of claim 15, further comprising:
determining a capacity of a buffer and determining that the second trace mode is to be switched to the first trace mode.

17. The method of claim 15, further comprising:
determining at least one of: a region of the first instructions being entered, the region of the first instructions being exited, a watchpoint being reached, and a breakpoint being reached and determining that the second trace mode is to be switched to the first trace mode based on determining the at least one of the region of the first instructions being entered, the region of the first instructions being exited, the watchpoint being reached, and the breakpoint being reached.

18. The method of claim 15,
wherein if the first trace mode is a traditional trace mode, switching from the first trace mode to the second trace mode without halting the processing unit includes switching from the traditional trace mode to a history trace mode without halting the processing, wherein the history trace mode is the second trace mode; and
wherein if the first trace mode is the history trace mode, switching from the first trace mode to the second trace mode without halting the processing unit includes switching from the history trace mode to the traditional trace mode without halting the processing, wherein the traditional trace mode is the second trace mode.

19. The method of claim 15, further comprising:
determining that there is not a change of flow boundary of the second instructions; and
switching from the second trace mode to the first trace mode without halting the processing unit.

20. The method of claim 15, further comprising:
determining a capacity of a buffer; and
determining that the second trace mode is to be switched to the first trace mode based on the capacity of the buffer.

* * * * *